UNITED STATES PATENT OFFICE.

ZACHARIE ROUSSIN AND ALCIDE F. POIRRIER, OF PARIS, FRANCE.

IMPROVEMENT IN COLORS DERIVED FROM NITRANILINE.

Specification forming part of Letters Patent No. 211,525, dated January 21, 1879; application filed November 21, 1878.

*To all whom it may concern:*

Be it known that we, ZACHARIE ROUSSIN, chemist, and ALCIDE FRANÇOIS POIRRIER, manufacturer, both of Paris, in the Republic of France, have invented certain new Coloring-Matters Obtained by the Reaction of the Diazoic Derivative of Nitraniline upon the Amines, the Amides, and the Phenols; and we hereby declare the following to be a full, clear, and exact description of the same.

Nitraniline obtained according to known processes, and notably by the action of alkalies upon nitrous acetanilide, is transformed into a diazoic derivative by mixing it in equivalent quantities with an aqueous solution of nitrite of soda, and by adding to the mixture thus obtained sulphuric acid diluted with water.

Having thus stated how the nitraniline is obtained, we shall now proceed to give the preparation of the coloring-matter subject-matter of this patent. This may be divided under five reactions, namely:

First. Reaction of the diazoic derivative obtained as above upon the naphthionic acid. An aqueous solution of one equivalent of the diazoic derivative of nitraniline, reacting at ordinary temperature upon an equivalent of naphthionic acid, produces instantaneously a colored product but little soluble, which is washed, and which can be transformed into sodic or ammoniacal salt. This coloring-matter dyes wool and silk red, analogous to orseille.

Second. Reaction of the diazoic derivative upon phenic acid. Phenic acid in alkaline solution, reacting at equal equivalents upon the diazoic derivative of nitraniline, gives instantaneously, even at ordinary temperatures, birth to a coloring-matter which crystallizes easily in the form of sodic salt. This body dyes yellow, slightly reddish.

Third. By substituting in the preceding preparation for the phenic acid an aqueous solution of resorcine, a coloring-matter in the form of a precipitate, which can be readily washed and dried, is obtained. The coloring-matter is an orange-yellow.

Fourth. Equal equivalents of phenylenediamine and of the diazoic derivative of nitraniline will instantaneously, in the presence of water, react upon each other to produce a yellow coloring-matter, which, on being washed, is transformed into sodic salt. By means of this substance wool, cotton, and silk are dyed yellow with a reddish tint.

Fifth. Reaction of the diazoic derivative upon the alpha and beta naphthols.

By causing to react at ordinary temperature and at equal equivalents an alkaline solution of naphthol upon an acid solution of the diazoic derivative, a red precipitate insoluble in water in the acids and alkalies is obtained. This precipitate is easily washed and purified in cold water.

When a tissue is impregnated with an aqueous solution of the diazoic derivative of nitraniline, and then immersed in a solution (as feebly alkaline as possible) of alpha or beta naphthol, it becomes dyed red. This operation may be repeated in the same manner upon the same tissue until the desired shade is obtained. These insoluble coloring-matters may be readily sulfoconjugated by the ordinary methods, and they then become soluble in water.

By the reaction of the diazoic derivative of nitraniline upon the one or the other of the naphthols previously sulfoconjugated, there is obtained by simple mixture at ordinary temperature and with equal equivalents of aqueous solution of these substances certain orange-red coloring-matters which are soluble in water. These matters are gathered upon canvas washed in cold water, compressed, and then transformed into sodic salt.

The diazoic derivatives of nitro-naphthylamine, of the nitro-toluidines, and of the nitro-xyloidines behave with the substances before enumerated in the same manner as the diazoic derivatives of nitraniline, and produce similar and analogous coloring-matters. This method is applicable to all isomeric nitranilines.

Having thus fully described our said invention, what we claim is—

1. The coloring-matter herein described, obtained by the reaction of the diazoic derivatives of nitraniline upon the amines, amides, and phenols.

2. The process or processes herein described of producing coloring-matters by the reaction of the diazoic derivatives of nitraniline upon the amines, amides, and phenols.

In testimony whereof we have signed our names to this specification before two subscribing witnesses.

Z. ROUSSIN.
A. F. POIRRIER.

Witnesses:
ROBT. M. HOOPER,
J. ARMENGAUD, Jeune.